US009151665B1

(12) United States Patent  (10) Patent No.: US 9,151,665 B1
Lewkow                    (45) Date of Patent:    Oct. 6, 2015

(54) DEVICES AND METHODS FOR PROVIDING OPTICAL ELEMENT FOCUS FUNCTIONALITY WITH A MOVABLE IMAGER DIE

(71) Applicant: Google Inc., Mountain View, CA (US)

(72) Inventor: Roman Lewkow, Mountain View, CA (US)

(73) Assignee: Google Inc., Mountain View, CA (US)

( * ) Notice: Subject to any disclaimer, the term of this patent is extended or adjusted under 35 U.S.C. 154(b) by 189 days.

(21) Appl. No.: 13/853,168

(22) Filed: Mar. 29, 2013

(51) Int. Cl.
G02B 7/28 (2006.01)
H04N 5/232 (2006.01)
G01J 1/04 (2006.01)

(52) U.S. Cl.
CPC .......................................... *G01J 1/04* (2013.01)

(58) Field of Classification Search
CPC ............................. H04N 5/23212; G02B 7/28
USPC .................................... 250/201.2; 348/72–88
See application file for complete search history.

(56) References Cited

U.S. PATENT DOCUMENTS 6,828,545 B1 * 12/2004 Hamilton et al. .......... 250/214.1
7,190,039 B2    3/2007  Boettiger et al.
7,214,919 B2    5/2007  Boemler
8,124,929 B2    2/2012  Olsen et al.
2006/0061660 A1 * 3/2006  Brackmann ................ 348/208.1
2006/0125950 A1 * 6/2006  Chen ............................ 348/345
2012/0320257 A1 * 12/2012 Shabtay et al. .............. 348/349
2013/0193303 A1 * 8/2013  Smith et al. ................ 250/203.6

OTHER PUBLICATIONS

Leelavanichkul et al., "Design of micro-integrated optical MEMS for camera applications" (OPTO 2008, Photonic Metrology, 8th International Conference on Optical Technologies for Sensing & Measurement. IRS2 2008, 10th International Conference on Infrared Sensors & Systems, 33-8, 2008.

Harvey, "Design and Fabrication of Micro-Electro-Mechanical Structures for Tunable Micro-Optical Devices", AFIT/ENG/GEO-02M-01, 215p, Mar. 2002.

* cited by examiner

*Primary Examiner* — Renee D Chavez
(74) *Attorney, Agent, or Firm* — McDonnell Boehnen Hulbert & Berghoff LLP

(57) ABSTRACT

Example devices and methods for providing optical element focus functionality with a movable imager die are provided. In one example, a device comprises an optical element configured in a fixed position and configured to provide focus settings, an imager die configured to receive image data through the optical element, and an actuator coupled to the imager die and configured to cause a change in a position of the imager die. The change in the position of the imager die may cause a relationship between the imager die and the optical element to be configured in a given focus setting of the plurality of focus settings.

7 Claims, 6 Drawing Sheets

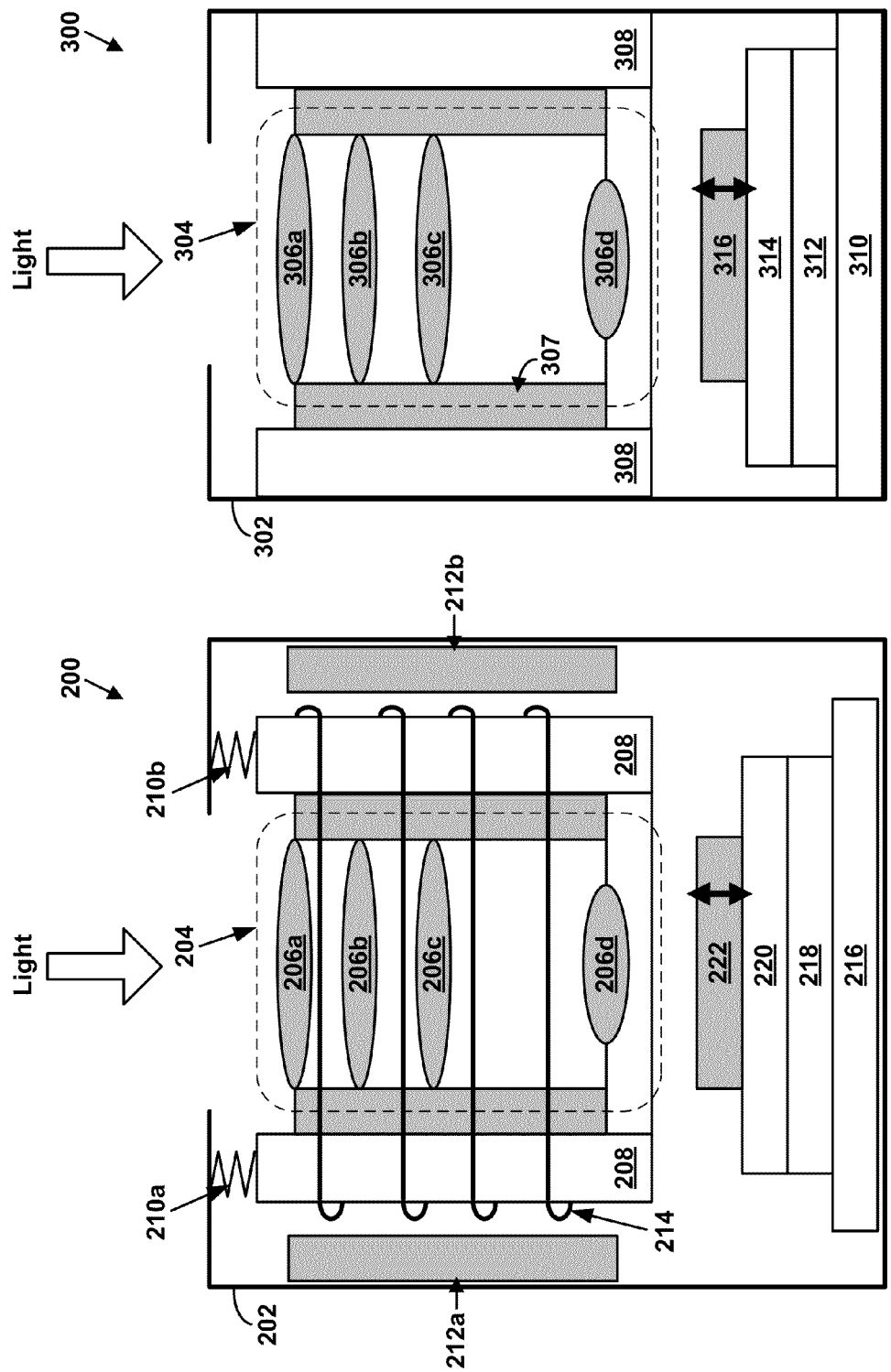

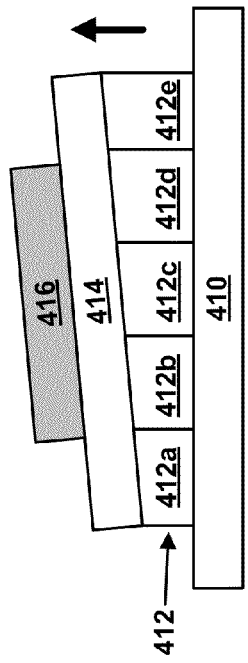
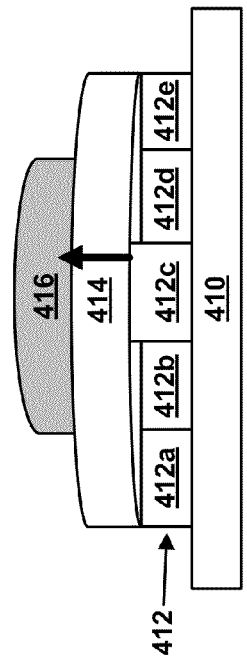
FIG. 4B
FIG. 4C
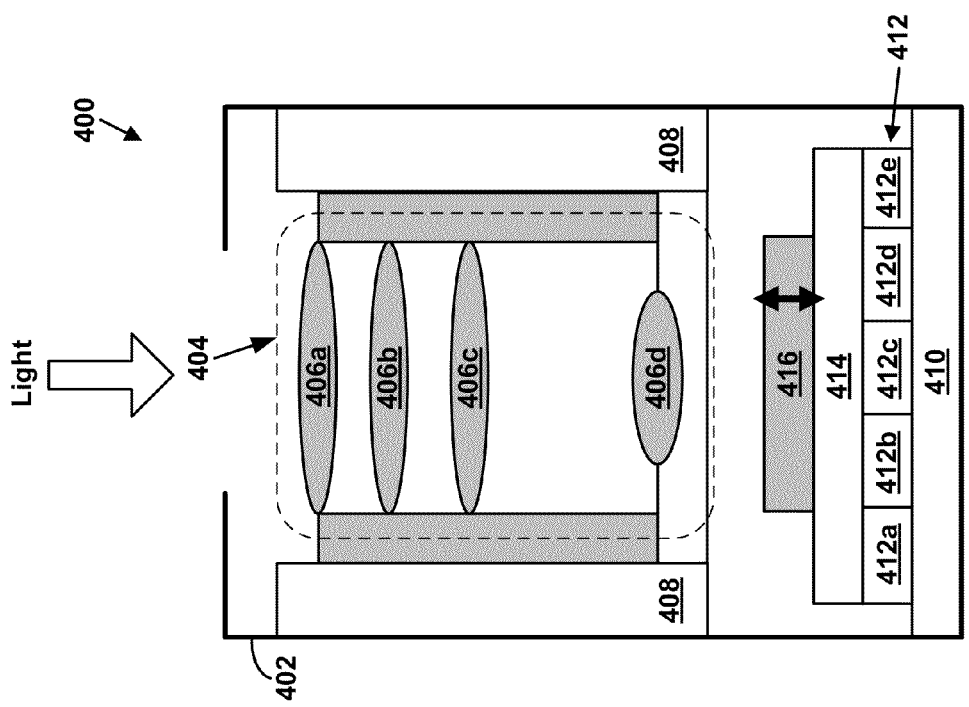
FIG. 4A

DEVICES AND METHODS FOR PROVIDING OPTICAL ELEMENT FOCUS FUNCTIONALITY WITH A MOVABLE IMAGER DIE

BACKGROUND

Unless otherwise indicated herein, the materials described in this section are not prior art to the claims in this application and are not admitted to be prior art by inclusion in this section.

Imaging systems typically have a finite range of focus (a range of distances from a camera in which all objects are rendered with acceptable detail and sharpness). In practical use, when working with natural scenes, it may be necessary to modify a focal range of the imaging system to bring elements of the scene that are of interest into sharp focus (while possibly accepting blurring of other parts of the scene).

Traditional imaging devices (still cameras, camcorders) typically adjust the focal range by moving internal elements of a camera lens. A camera lens is an optical lens or an assembly of lenses used with a camera body to capture images of objects. In some examples, example camera lens may include a lens assembly that is coupled to an actuator to change a focus setting of the lens assembly. The actuator coupled to the lens assembly may consume power to accomplish the change in focus. The actuator may continue to consume power to retain the lens assembly in the focus setting.

SUMMARY

Within examples, devices and methods for providing optical element focus functionality with a movable imager die are provided.

In one example, a device is provided that comprises an optical element configured in a fixed position and configured to provide focus settings, and an imager die configured to receive image data through the optical element. The device also comprises an actuator coupled to the imager die and configured to cause a change in a position of the imager die, and the change in the position of the imager die causes a relationship between the imager die and the optical element to be configured in a given focus setting of the focus settings.

In another example, a device is provided that comprises a housing including an optical element configured in a fixed position within the housing and an imager die having an adjustable position within the housing. The device also comprises an actuator within the housing and coupled to the imager die and configured to cause a change in a position of the imager die, and the change in the position of the imager die causes a relationship between the imager die and the optical element to be configured in a given focus setting of the focus settings.

In still another example, a method is provided that comprises providing a housing including an optical element configured in a fixed position within the housing and an imager die having an adjustable position within the housing, and causing an actuator within the housing and coupled to the imager die to change a position of the imager die. The change in the position of the imager die causes a relationship between the imager die and the optical element to be configured in a given focus setting of the focus settings.

In still another example, a device is provided comprising a means for causing an actuator within a housing and coupled to an imager die to change a position of the imager die. The housing further includes an optical element configured in a fixed position within the housing and the imager die having an adjustable position within the housing. The change in the position of the imager die causes a relationship between the imager die and the optical element to be configured in a given focus setting of the focus settings.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 2 illustrates a side view cross-section of an example device that may be configured as a camera module.

FIG. 3 illustrates a side view cross-section of another example device that may be configured as a camera module.

FIG. 4A illustrates a side view cross-section of another example device that may be configured as a camera module.

FIG. 4B illustrates a portion of the device in FIG. 4A.

FIG. 4C illustrates another portion of the device in FIG. 4A.

DETAILED DESCRIPTION

The following detailed description describes various features and functions of the disclosed systems and methods with reference to the accompanying figures. In the figures, similar symbols identify similar components, unless context dictates otherwise, and the figures or components of the figures may not necessarily be drawn to scale for illustration purposes. The illustrative system and method embodiments described herein are not meant to be limiting. It may be readily understood that certain aspects of the disclosed systems and methods can be arranged and combined in a wide variety of different configurations, all of which are contemplated herein.

Within examples, a device is described that comprises an optical element configured in a fixed position with respect to the assembly housing, a movable imager die, and an actuator coupled to the imager die and configured to cause a change in a position of the imager die. The change in the position of the imager die causes a relationship between the imager die and the optical element to be configured in a given focus setting of a plurality of focus settings that may be finite or continuous along all possible focus settings. Thus, in contrast to traditional imaging devices that typically adjust the focal range of the imaging system to bring elements of a scene that are of interest into sharp focus by moving internal elements of the lens with a voice coil motor (VCM) (while maintaining the imager die in a fixed position within the housing), examples herein include removing the VCM of the lens assembly and enabling movement of the imager die along an optical axis of the system.

Within examples, a lens assembly of the device is configured to remain in a fixed position within a housing of the device. Because the imager die is smaller and lighter than the lens assembly, the imager die can be moved with less power and more quickly. Actuation of the imager die can be performed with a variety of electromechanical linear actuators, such as for example, piezoelectric (with motion amplification structures), micro-electro-mechanical systems (MEMS), shape memory alloys, etc.

In some examples, the actuator may include multiple individual actuator components placed under the imager die to provide unique focus control settings by generating a tilted focal plane or a deformed (non-planar) focal surface, for example. As another example, a multi-aperture, multi-imager structure may be provided with individual imager die on a shared carrier, or on a shared die, or individually mounted on carriers and actuated.

Figure 1B:
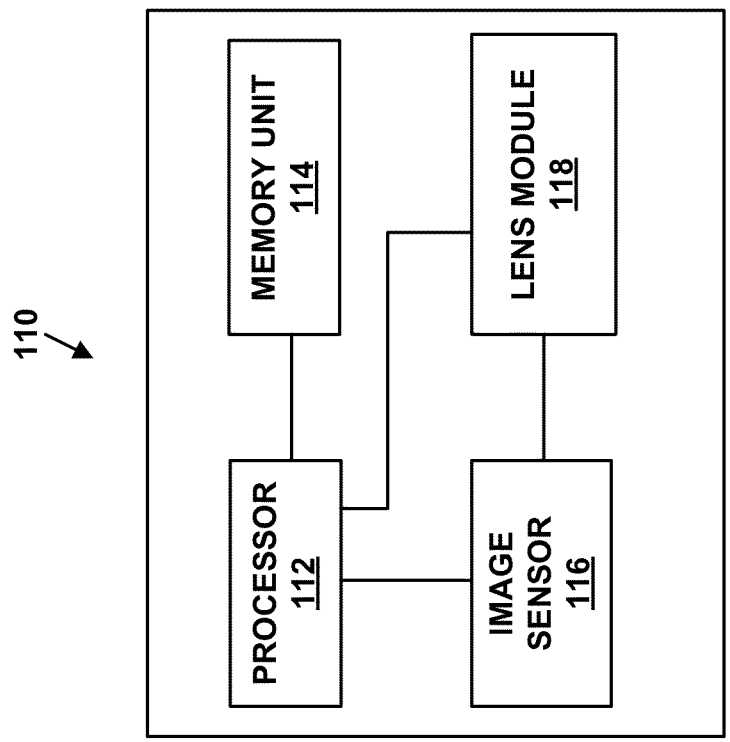
FIG. 1B illustrates another embodiment of an example device.
Figure 1A:
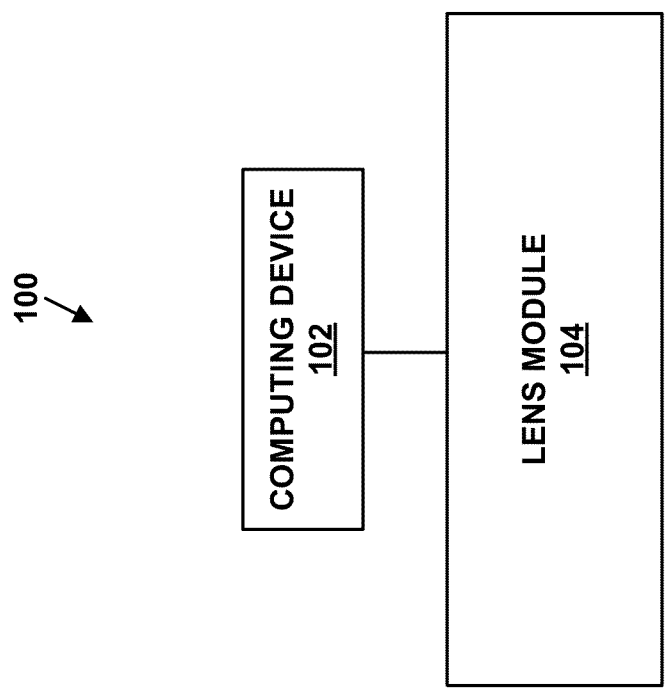
FIG. 1A illustrates a block diagram of an example device.

FIG. 1A illustrates a block diagram of an example device 100. The device 100 may include a computing device 102 that is coupled to a lens module 104. The computing device 102 may be coupled to the lens module 104, for example, mechanically, through electrical circuitry, or by using electrical cables. The computing device 102 and the lens module 104 are shown to be separate components of the device 100.

The computing device 102, for example, may be or may include a camera, a handheld device, a computer, a head-mounted device, or other wearable computing device. In some examples, the computing device 102 may include a battery to provide power to the computing device 102 and the lens module 104. In other examples, the computing device 102 may receive power from a power unit and provide power to the lens module 104.

The lens module 104 may include one or more image sensors that receive light focused by a plurality of optical element assemblies included in the lens module 104. In other examples, the image sensor may be included in the computing device 102. The lens module 104 may also include a first actuator configured to change the position of the lens module 104 to a position corresponding to one of a plurality of focus settings, which can be predetermined focus settings (i.e., finite number) or a setting along a continuous range of settings where the setting is not predetermined.

The device 100 may be configured to receive light focused by the lens module 104 and provide data indicative of an image represented by the light focused. In some examples, the device 100 may store the data as well or provide the data to a display that may be included in the device 100.

FIG. 1B illustrates another embodiment of an example device 110. The device 110 may include a processor 112, a memory unit 114 and an image sensor 116 to facilitate processing and storage of data from the image sensor 116. The image sensor 116, for example, is coupled to a lens module 118 that is shown included in the device 110, which may be configured to receive light focused by the lens module 118.

The device 110, for example, may be or include a camera, a handheld device, a computer or a head-mounted device, or other wearable computing device. In some examples, the device 110 may include a battery to provide power to the device 110 and components included in the device 110. In other examples, the device 110 may receive power from a power unit and provide power to the components included in the device 110. For example, the device 110 may include the processor 112, the memory unit 114, the image sensor 116, and the lens module 118. The device 110, for example, may also include other circuitry (not shown) including at least one driver for the lens module 118.

The processor 112, for example, may be configured to receive data from the image sensor 116 indicative of an image focused by the image sensors 116. The processor 112 may further process the data and provide the data for storage in memory unit 114. The processor 112 may also process the data and provide the processed data to a display (not shown).

The processor 112 may also be configured to provide instructions for other components in the device 110 to facilitate capturing the image at a correct focus. The instructions may include instructions to drive the lens module 118 to provide a given focus setting from a plurality or continual number of focus settings that corresponds to a desired image focus.

The memory unit 114 included in FIG. 1B may include, for example, static memory or a media storage device. For example, the memory unit 114 may comprise an SD card or a USB memory device. The memory unit 114 may also be configured, for example, to store image data provided by the processor 112 and to provide image data stored on the memory unit 114 to the processor 112. The memory unit 114 may also comprise chemical storage. For example, a photography film may be utilized to chemically store the image data.

The image sensor 116 included in FIG. 1B may include, for example, an array of semiconductor pixel sensors (e.g., a CMOS image sensor or a similar device) configured to receive light focused by the lens module 118 and provide data indicative of the image focused by lens module 118. In other examples, the image sensor 116 may be a charge-coupled device (CCD). The image sensor 116 may be coupled to a printed circuit board and aligned with optical axes of optical element assemblies included in the lens module 118.

The lens module 118 may include one or more optical element assemblies. The one or more optical element assemblies focus light entering the lens module 118 onto the image sensor 116. The lens module 118 may be configured to change a focus setting of the one or more optical element assemblies due to instructions received from processor 112. The lens module 118 may have a fixed position within the device 110 and a focus setting of the device 110 can be changed by changing a position of one or more of the image sensor 116, for example.

The device 110 may be configured to receive light focused by the lens module 118 onto the image sensor 116 and provide data indicative of an image represented by the light focused to the processor 112. For example, the device 110 may utilize the processor 112 to configure the lens module 118 to a given focus setting. The processor 112 may then utilize the image sensor 116 to capture an image generated by lens module 118 and store the image in the memory unit 114. In other examples, the device 110 may utilize processor 112 to process data representing the captured image or retrieve data from memory unit 114, process the data, and provide data for display.

FIG. 2 illustrates a side view cross-section of an example device 200 that may be configured as a camera module. The device 200 may include an enclosure structure 202 that houses the various components of the device 200. The device 200 includes an optical element assembly 204 including a plurality of optical elements 206a-d that is coupled to a frame 208. The frame 208 is coupled to the enclosure structure 202 by springs 210a-b. The device 200 also includes magnets 212a-b that provide a first magnetic field through the frame 208. The frame 208 is also coupled to an electromagnetic coil 214 that provides a controlled second magnetic field through the frame 208. The device 200 also includes a module base 216 that includes an actuator 218, a die carrier 220, and an imager die 222.

The enclosure structure 202 included in the device 200 may comprise a plastic, metal or composite structure. The enclosure structure 202 may be included in a computing device (not shown) coupled to the device 200 or may be independent of the computing device. In some examples, the enclosure structure 202 may have the shape of a cube, or a cylinder.

The plurality of optical elements 206a-d included in the optical element assembly 204 may comprise lens, mirrors, prisms, filters or any other component that is configured to manipulate light passing through the one or more optical elements. Light may be focused, for example, due to a diffraction property or a reflective property of the one or more optical elements, or its spectral characteristics may be modified by filters.

The imager die 222 may include one or more image sensors, for example, including an array of semiconductor pixel sensors (e.g., CMOS image sensors or similar devices) configured to receive light and to provide data indicative of the light. In other examples, the imager die 222 may be a charge-coupled device (CCD). The imager die 222 may be a component provided on a printed circuit board (PCB). In some examples, the imager die 222 may be aligned with optical axes of the optical element assembly 204.

In the device 200, the optical element assembly 204 is configured in a spatial arrangement with the imager die 222 such that light can be focused onto the imager die 222 according to one of a plurality of focus settings (either predetermined or continuous focus setting). In FIG. 2, the optical element assembly 204 may be configured to move in a direction parallel to an optical axis of the imager die 222 (e.g., shown in FIG. 2 as an axis along which light is received). The optical element assembly 204 may move up and down, or closer to and farther away from the imager die 222. In some examples, the optical element assembly 204 may also be configured to move in a direction perpendicular to the optical axis of the imager die 222 (or side to side). In still other examples, the optical element assembly 204 may also be configured to move both parallel to and perpendicular to an optical axis so as to move generally diagonal with respect to the optical axis. The optical element assembly 204 may be configured to move through actuation of at least one of the magnets 212a-b, the electromagnetic coil 214, and the springs 210a-b. More generally, the device 200 may move the optical element assembly 204 using these components configured as a voice coil motor (VCM).

Thus, in one example operation, the device 200 includes the lens frame 208, supported by the lens springs 210a-b above the imager die 222, and the electromagnet coil 214 placed on the lens frame 208 is energized by a coil driver (not shown) to produce a controlled magnetic field in the electromagnet coil 214 that interacts with a magnetic field produced by the magnets 212a-b placed around the lens frame 208. The magnetic field interaction produces a force proportional to an amount of current driven through the electromagnet coil 214 that force combines with spring force to move the lens frame 208 closer to or farther from the imager die 222. A change in position of the lens frame 208 causes a change in position of the optical element assembly 204 resulting in a change in an effective focus position (lens closer to the imager die 222 produces far focus, lens away from the imager die 222 produces near focus). The electromagnet coil 214 consumes power, which is position-dependent (typically no power for far focus, with lens frame position maintained by springs, and increasing coil current for closer focus settings). In some examples, a position retention element may be added to reduce or eliminate holding power draw of the VCM.

Within other examples, the imager die 222 may additionally or alternatively be configured to move closer to or further away from the optical elements 206a-d of the optical element assembly 204. In this example, the optical element assembly 204 may be configured in a fixed position within the enclosure 202 (such as for a coarse adjustment), and the actuator 218 may be configured to move the die carrier 220 causing movement of the imager die 222 with respect to the fixed optical assembly 204 (such as for a fine adjustment).

FIG. 3 illustrates a side view cross-section of another example device 300 that may be configured as a camera module. The device 300 includes a housing or enclosure structure 302 including an optical element assembly 304 with a plurality of optical elements 306a-d coupled to a lens barrel 307 and coupled to a frame 308. The lens barrel 307 and/or the frame 308 maintains the optical element assembly 304 in a fixed position within the housing 302, and the frame 308 may also be in a fixed position within the housing 302.

The device 300 further includes a module base 310 coupled to an actuator 312 upon which a die carrier 314 sits. The die carrier 314 includes an imager die 316. Components in the device 300 may be similar to components of the device 200 in FIG. 2, such as the enclosure structure 302, the imager die 316, etc.

In some examples, within operation, the actuator 312 may be configured to cause a change in a position of the imager die 316 to cause a relationship between the imager die 316 and the optical elements 306a-d to be configured in a given focus setting of a plurality of focus settings, which may be a finite number of predetermined focus settings or any setting along a continuous range of focus settings. By moving the imager die 316 closer to or farther from the optical elements 306a-d, a focus setting of the device 300 is changed. The imager die 316 may be moved along an optical axis of the device 300, such as along an axis in which light is received.

The example device 300 shown in FIG. 3 shows a camera module with a fixed optical element assembly 304 and a moving imager die 316 that has a bottom actuation. The optical element assembly 304 is mounted in a fixed position within the enclosure 302 and is not actuated (in contrast to the device 200 shown in FIG. 2 in which the optical element assembly 204 may be moved within the enclosure 202). A fixed module base 310 is attached within the enclosure 302 and carries a stack comprised of the actuator 312 and the die carrier 314 holding the imager die 316. The actuator 312 moves the die carrier 314 up and down changing a distance between the optical elements 306a-d and a surface of the imager die 316, thus changing a focal position of the device 300. Use of a VCM motor or any actuation of the optical element assembly 304 is removed. In some instances, absence of a free-hanging lens assembly removes susceptibility to mechanical vibration and long, oscillatory, settling times as may be seen with use of a VCM mechanism.

In the example shown in FIG. 3, the imager die 316 is positioned between the actuator 312 and the optical elements 306a-d, and the actuator 312 is configured to move the imager die 316 toward or away from the optical elements 306a-d. The actuator can move the imager die 316 closer to the optical element to configure the imager die in a far focus setting, and can move the imager die 316 away from the optical elements 306a-d to configure the imager die 316 in a near focus setting. The relationship between the imager die 316 and the optical elements 306a-d includes a given distance between the imager die 316 and the optical elements 306a-d, and the given distance corresponds to a focus setting. The actuator 312 is configured to provide adjustable focus by moving the imager die 316 within the housing 302.

Within examples, the imager die 316 is smaller and lighter than the optical element assembly 304, and the imager die 316 can be moved using less power than required to move the optical element assembly 304, and the imager die 316 may also be moved at a faster rate than typically seen with movement of the larger optical element assembly 304. As shown in FIG. 3, using the imager die 316 actuation, the device 300 may be configured to include fewer components and can be made in a smaller enclosure. Within examples, by leaving the optical element assembly 304 and optical elements 306a-d in a fixed position within the enclosure 302 and moving the imager die 316 instead, actuation power requirements can be reduced, which can be beneficial for many optical systems, including those within mobile or wearable systems and within multi-imager array systems.

Within examples, the actuator 312 may take the form or a variety of electromechanical linear actuators, including for example, piezoelectric (with motion amplification structures), a micro-electro-mechanical system (MEMS), or shape memory alloys. Electrical connections to the imager die 316 can be configured to allow for an amount of motion up and down, such as using wires, bondwires or flex PCB connections, for example.

FIG. 4A illustrates a side view cross-section of another example device 400 that may be configured as a camera module. The device 400 includes a housing or enclosure structure 402 including an optical element assembly 404 with a plurality of optical elements 406a-d coupled to a frame 408. The frame 408 maintains the optical element assembly 404 in a fixed position within the housing 402, and the frame 408 may also be in a fixed position within the housing 402.

The device 400 further includes a module base 410 coupled to an actuator 412 upon which a die carrier 414 is mounted. The die carrier 414 includes an imager die 416. Components in the device 400 may be similar to components of the device 200 in FIG. 2 or the device 300 in FIG. 3, for example.

The device 400 may be configured as camera module with a fixed lens assembly 404 and a moving imager die 416 with multiple bottom actuation. For example, the actuator 412 may include multiple actuation components 412a-e, and each actuation component 412a-e may be controlled independently.

In an example operation of the device, 400, the optical element assembly 404 is mounted in a fixed position within the module enclosure 402 and is not actuated, and the fixed module base 410 attached within the module enclosure 402 and carries a stack comprised of a collection of the actuators 412a-e and the die carrier 414 holding the imager die 416. The actuators 412a-e move the die carrier 414 up and down to change a distance between the optical element assembly 404 and a surface of the imager die 416, thus changing a focal position.

FIG. 4B illustrates a portion of the device 400. In FIG. 4B, the multiple independent actuators 412a-e may be independently controlled to provide additional degrees of freedom in control of the position of the imager die. For example, a slight tilt may be introduced in a position of the imager die 416 by actuating each of the actuator components 412a-e separately or in different amounts to produce a tilt plane focus. In some examples, the die carrier 414 may be designed to be deformable, and a non-planar focal plane may be created by twisting the die carrier 414 and the imager die 416 mounted on the die carrier 414 out of plane, e.g., to provide a desired focal plane shape that may match a scene or lens characteristics.

FIG. 4C illustrates another portion of the device 400. In FIG. 4C, a center actuator 412c may be actuated to introduce a bend into the die carrier 414 and the imager die 416. Thus, by actuating the components 412a-e in a controlled fashion, a tilt of a flat plane can be provided, or even a bend in the die carrier 414 to provide some adjustable focus within a scene. A deformed (non-planar) focal surface can be provided, such as a globally curved surface, or locally adapted focal position. Each of the actuator components 412a-e may be configured to move a different portion of the die carrier 414 and the imager die 416.

Figure 5:
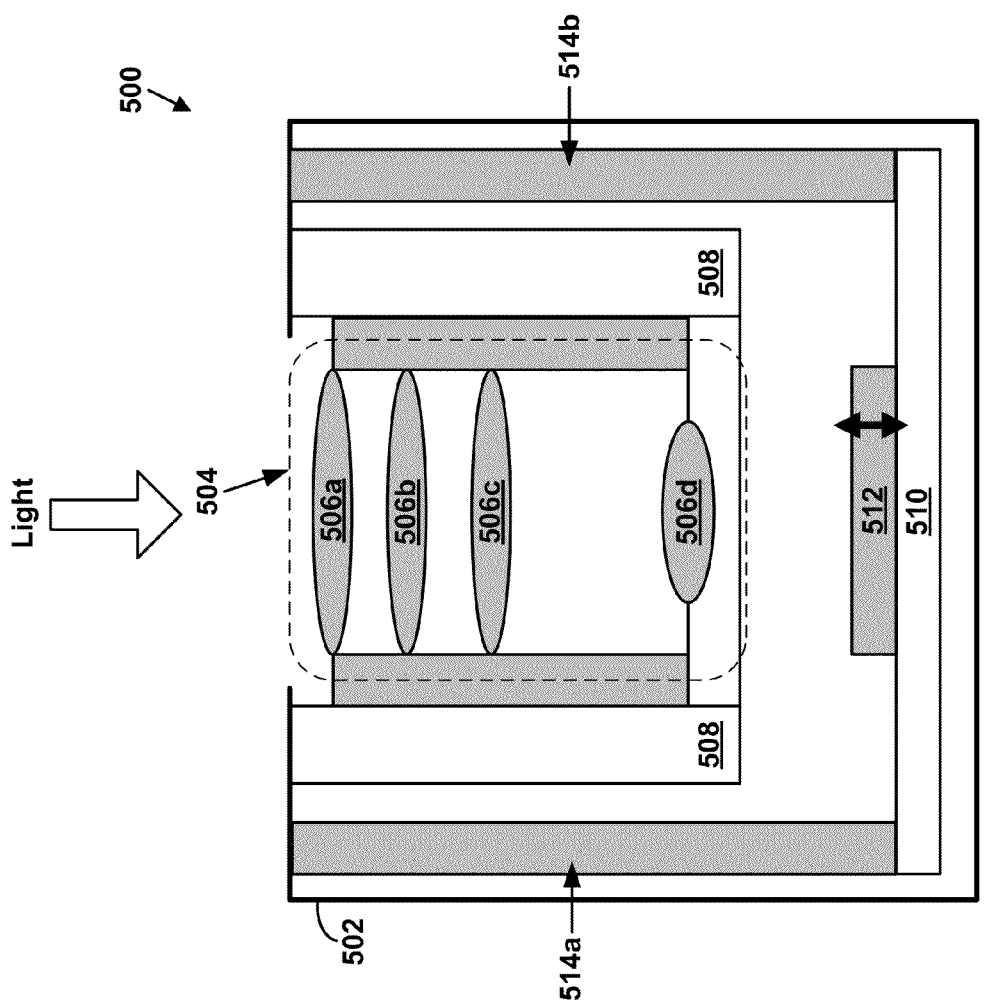
FIG. 5 illustrates a side view cross-section of another example device that may be configured as a camera module.

FIG. 5 illustrates a side view cross-section of another example device 500 that may be configured as a camera module. The device 500 includes a housing or enclosure structure 502 including an optical element assembly 504 with a plurality of optical elements 506a-d coupled to a frame 508. The frame 508 maintains the optical element assembly 504 in a fixed position within the housing 502, and the frame 508 may also be in a fixed position within the housing 502.

The device 500 further includes a die carrier 510 on which an imager die 512 is mounted. Components in the device 500 may be similar to components of the device 200 in FIG. 2, components of the device 300 in FIG. 3, or components of the device 400 in FIG. 4, for example.

The device 500 also includes side actuators 514a-b coupled to the die carrier 510 and to a top of the housing 502. The device 500 is configured as a camera module with a fixed optical element assembly 504 and a moving imager die 512 through top actuation. The actuators 514a-b may be in a format that requires more length to provide required motion (e.g., piezoelectric material may change by a percentage of length, and as an example to create a 200 micrometer variation, a longer actuator may be used). The device 500 may be smaller than devices shown in FIGS. 2-4, since no bottom actuators are needed, for example.

Within one example, operation of the device 500 includes the optical element assembly 504 mounted in a fixed position within the module enclosure 502 and the optical element assembly 504 is not actuated. The actuators 514a-b are attached to an upper end of the module enclosure 502 and to the die carrier 510, and the actuators 514a-b move the die carrier 510 up and down to change a distance between the optical element assembly 504 and a surface of the imager die 512 to change a focal position. The actuator 514a-b may include a continuous block around the optical element assembly 504, or may comprise several (e.g., one for each corner of the die carrier 510) column-shaped elements capable of independent control and actuation to produce effects, such as tilt focus, for example. The actuators 514a-b may be positioned along a side of the optical element assembly 504 and may be configured to pull the die carrier toward and away from the optical elements 506a-d.

The illustrations shown in FIGS. 2-5 are cross-section side views of example devices. In some examples, devices described herein may include a two-dimensional grid of actuators for a more control of die position.

Figure 6:
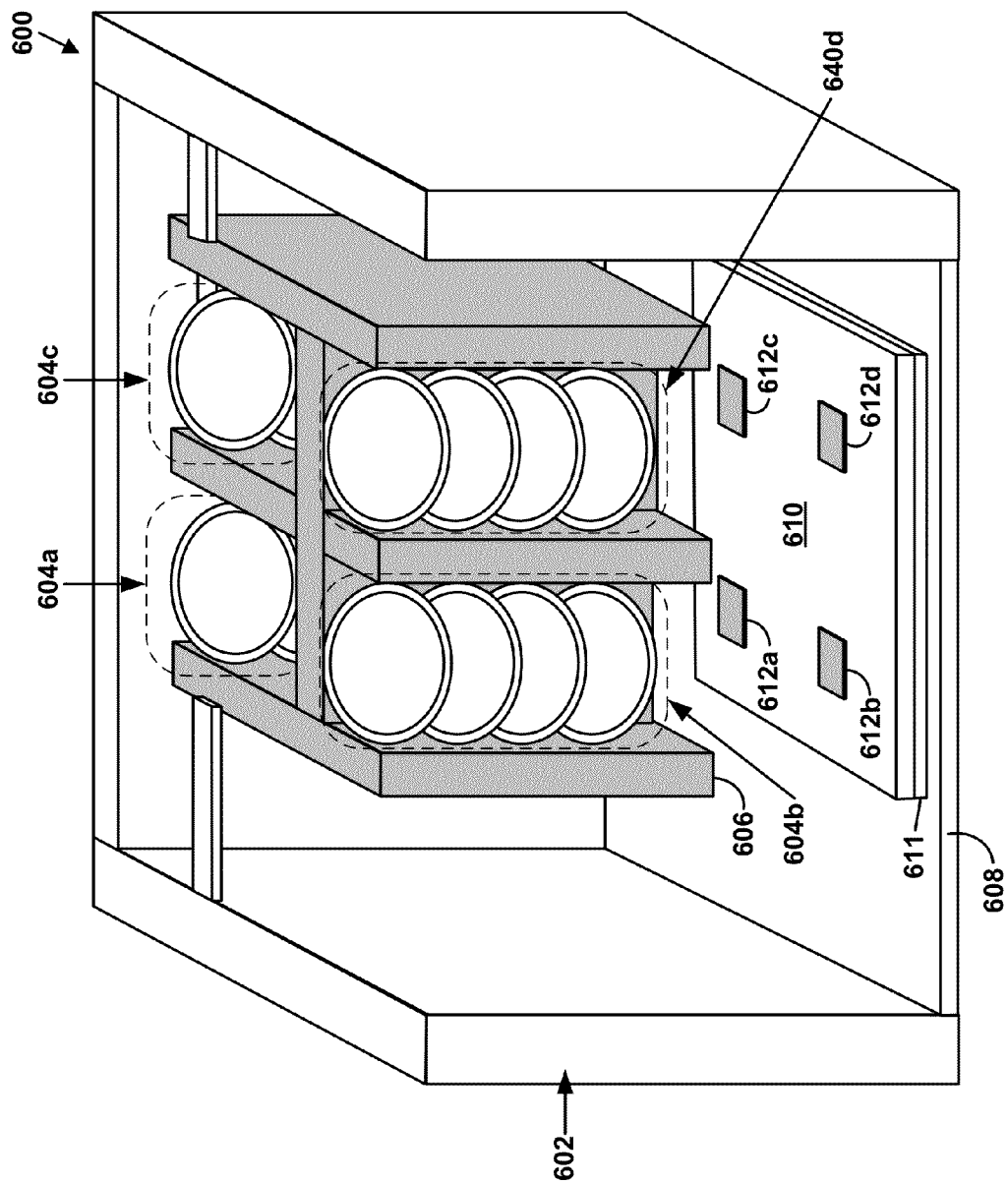
FIG. 6 illustrates another example device that may be configured as a lens module.

FIG. 6 illustrates another example device 600 that may be configured as a lens module. The device 600 may include an enclosure structure 602 that houses the various components of the device 600. The device 600 includes a plurality of optical element assemblies 604a-d that are coupled in a fixed spatial arrangement using a frame 606 and are provided in a fixed position within the housing 602. The frame 606 maintains the plurality of optical element assemblies 604a-d in the fixed arrangement in the housing 602.

The device 600 also includes a module base 608 that includes a die carrier 610 on which a plurality of imager dies 612a-d reside that are each configured to receive light focused by the plurality of optical element assemblies 604a-d, respectively. In the device 600, the plurality of optical element assemblies 604a-d is configured in the fixed spatial arrangement such that each of the plurality of optical element assemblies 604a-d focuses light onto at least one of the plurality of imager dies 612a-d. Although illustrated that the device 600 includes four optical element assemblies 604a-d, the device 600 may include more or fewer optical element assemblies than illustrated in FIG. 6.

In some examples, an optical axis of a given optical element assembly of the plurality of optical element assemblies 604a-d is offset from optical axes of other optical element assemblies of the plurality of optical element assemblies 604a-d and substantially parallel to the axis of motion of the imager dies 612a-d. For example, optical element assembly 604a has an optical axis aligned with image sensor 612a, and optical element assembly 604b has an optical axis aligned with image sensor 612b, and so on.

Figure 7:
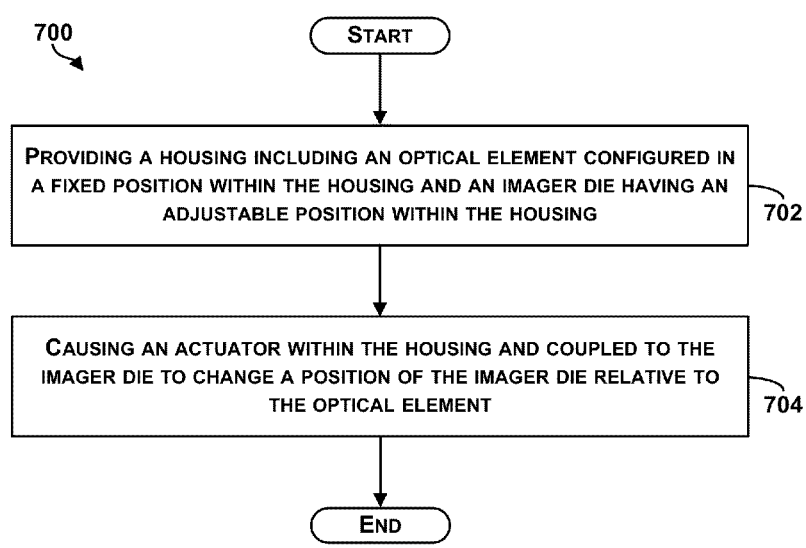
FIG. 7 is a block diagram of an example method for providing focus settings of a device that includes an optical element assembly, in accordance with at least some embodiments described herein.

In the device 600, the die carrier 610 is configured to be actuated by an actuator 611 (underneath the die carrier 610) to move the imager dies 612a-d a certain distance with respect to the fixed position optical element assemblies 604a-b. A position of the imager dies 612a-d corresponds to one of a plurality of focus settings of the device 600, and the plurality of settings may be predefined or any along a continual spectrum of possible settings. For example, a change in the position of any of the imager dies 612a-d causes a change in a given focus setting of the device 600. Any one of the imager dies 612a-d may be moved independently using multiple actuators underneath the die carrier 610 corresponding to the imager dies 612a-d, for example. In addition, the die carrier 610 may (in some examples) comprise four separate carriers, one for each imager die 612a-d FIG. 7 is a block diagram of an example method for providing focus settings of a device that includes an optical element assembly, in accordance with at least some embodiments described herein. Method 700 shown in FIG. 7 presents an embodiment of a method that could be used with any of the devices shown in any of FIGS. 1-6, for example. Method 700 may include one or more operations, functions, or actions as illustrated by one or more of blocks 702-704. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of a manufacturing or operation process.

At block 702, the method 700 includes providing a housing including an optical element configured in a fixed position within the housing and an imager die having an adjustable position within the housing. At block 704, the method 700 includes causing an actuator within the housing and coupled to the imager die to change a position of the imager die relative to the optical element. The change in the position of the imager die can cause a relationship between the imager die and the optical element to be configured in a given focus setting of a plurality of focus settings (predefined or continual setting). In an example where the actuator includes multiple actuation components that each may be actuated independently, the actuation components may be actuated in a sequence resulting in a desired focus setting of a tilted focal plane of the imager die with respect to an optical axis at which light is received. The actuator (or actuation components) may be configured to retain the imager die in the position to maintain the desired focus setting.

Although description of devices herein is directed to camera modules, components of the devices, or the devices themselves may take the form of other devices, such as, for example, imaging devices like document and image scanners, barcode readers, copiers, cameras, video cameras, microscopes, hand-held devices, head-mounted devices, wearable devices or telescopes.

Within examples, focusing techniques that are described for the device can be applied to other electronic devices that focus light. For example, projection devices such as displays may focus light using the methods described herein. Thus, example methods herein provide light focusing techniques that involve one or more optical element assemblies in a fixed position, and an actuator configured to cause a change in a position of an imager die resulting in a given focus setting.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device comprising:
a housing having an end configured to receive light;
an optical element configured in a fixed position within the housing and configured to provide focus settings;
an imager die having an adjustable position within the housing configured to receive image data through the optical element; and
side actuators coupled to the imager die and the end of the housing configured to receive light, the side actuators positioned along sides of the optical element between the optical element and the housing, wherein the side actuators are configured to pull the imager die toward or push the imager die away from the optical element to cause a change in a position of the imager die, wherein the imager die is configured to receive light through the optical element along an optical axis and the side actuators are configured to move the imager die along the optical axis, and wherein the change in the position of the imager die causes a relationship between the imager die and the optical element to be configured in a given focus setting of the focus settings.

2. The device of claim 1, wherein the side actuators are configured to move the imager die closer to the optical element to configure the imager die in a far focus setting.

3. The device of claim 1, wherein the side actuators are configured to move the imager die away from the optical element to configure the imager die in a near focus setting.

4. The device of claim 1, wherein the relationship between the imager die and the optical element includes a given distance between the imager die and the optical element, wherein the given distance corresponds to one of the focus settings.

5. The device of claim 1, wherein the side actuators comprise one or more of a piezoelectric component, a microelectro-mechanical system (MEMS), or a shape memory alloy.

6. The device of claim 1, further comprising one or more electrical connections to the imager die, wherein the electrical connections are configured to allow for the change in the position of the imager die.

7. The device of claim 1, further comprising a lens assembly that includes the optical element, wherein the lens assembly is configured in the fixed position, and wherein the lens assembly comprises:
- one or more optical elements configured to focus light, wherein the one or more optical elements include the optical element;
- a lens barrel configured to maintain the one or more optical elements in a fixed arrangement; and
- a lens frame coupled to the lens barrel and configured to provide a housing for the lens assembly.

\* \* \* \* \*